United States Patent [19]

Nishimura et al.

[11] Patent Number: 5,262,809
[45] Date of Patent: Nov. 16, 1993

[54] CAMERA ACCOMMODATING MAIN LAMP AND AUXILIARY LAMP

[75] Inventors: Syunji Nishimura; Minoru Takahashi, both of Omiya, Japan

[73] Assignee: Fuji Photo Optical Co., Ltd., Saitama, Japan

[21] Appl. No.: 889,438

[22] Filed: May 28, 1992

[30] Foreign Application Priority Data

Jun. 3, 1991 [JP] Japan .................. 3-50265[U]
Jun. 3, 1991 [JP] Japan .................. 3-159665

[51] Int. Cl.⁵ .................................. G03B 15/03
[52] U.S. Cl. ......................... 354/132; 354/145.1; 354/149.11
[58] Field of Search ............ 354/132, 126, 145.1, 354/149.11

[56] References Cited

U.S. PATENT DOCUMENTS 3,180,240  4/1965  Bohme et al.
4,918,477  4/1990  Matsuda et al.
5,019,845  5/1991  Asakura et al.
5,051,763  9/1991  Yukevich.

Primary Examiner—Monroe H. Hayes
Attorney, Agent, or Firm—Townsend, Snider & Banta

[57] ABSTRACT

A camera accommodates a main lamp for electronic flashing and an auxiliary lamp for preventing a red-eye phenomenon.

The auxiliary lamp for preventing a red-eye phenomenon is directly held by a holder composed of a material of a color having a light reflecting effect such as white. Since the holder also function as a reflecting plate, the structure of the camera is simplified. A transparent cover is integrally provided with at least a finder window, an electronic flash lamp window at which the main lamp for electronic flashing is disposed, and an auxiliary lamp window at which the auxiliary lamp is disposed. The transparent cover is attached to the camera as a part of a case, thereby simplifying the structure of the camera. The auxiliary lamp is preferably disposed in the area between the lens barrel at the central portion and the main lamp. Thus, the arrangement of parts in the camera avoiding waste is realized.

7 Claims, 4 Drawing Sheets

CAMERA ACCOMMODATING MAIN LAMP AND AUXILIARY LAMP

BACKGROUND OF THE INVENTION

1. Field of the Invention

The present invention relates to the structure of a camera equipped with an electronic flash equipment which has both a main lamp and an auxiliary lamp especially for preventing a red-eye phenomenon.

2. Description of the Related Art

Photography with an electronic flash suffers from a problem of what is called a red-eye phenomenon. That is, the eyes of the object come out red in the printed photograph. The red-eye phenomenon is produced because when an electronic flash is emitted toward the object such as a man and an animal, the light which enters the eyeballs from the pupils is reflected from the blood vessels in the eyeballs, so that the eyes themselves come out red in the printed photograph. In order to prevent this phenomenon, a method of reducing the diameters of the pupils by emitting a weak electronic flash prior to photographing (preliminary electronic flashing) so as to reduce the amount of light entering the eyeballs has recently been adopted.

In the case of preliminary electronic flashing by the use of a lamp provided in a camera, a method of emitting an electronic flash from a lamp such as a xenon tube by using capacitors different capacities has been proposed. According to this structure, a preliminary flash is emitted from the electronic flash lamp by the capacitor having a small capacity in synchronism with the shutter button, and after reducing the diameter of the pupils, a photograph is taken with an electronic flash by the capacitor having a large capacity.

If preliminary electronic flashing for preventing a red-eye phenomenon is carried out by utilizing the lamp for electronic flashing, it is advantageous in that only one lamp is sufficient both for preliminary electronic flashing and for electronic flashing for taking a photograph, but it is disadvantageous in that the complicated control for charging and discharging the capacitors having large and small capacities is required.

A method of preventing a red-eye phenomenon by an auxiliary lamp provided in a camera in addition to a lamp for electronic flashing has conventionally been proposed, but this method involves the following problem.

FIG. 8 shows an auxiliary lamp held by a holder in a camera. A lamp (tube) 1 is provided with a reflecting plate 2 having a parabolic section. The reflecting plate is held by a holder 3. By electrically connecting the lamp 1 with a pin 4, the light emission from the lamp 1 is enabled. The emitted light is converted by the reflecting plate 2 and projected toward the front surface of the camera.

In order to secure the space for attaching the auxiliary lamp 1, the size of the camera itself must be enlarged. Especially, since the reflecting plate 2 has a parabolic shape which expands towards the front surface of the camera, as shown in FIG. 8, if this auxiliary lamp is provided in the camera, it is impossible to reduce the size and the weight of the camera.

SUMMARY OF THE INVENTION

Accordingly, it is a first object of the present invention to eliminate the above-described problems in the related art and to provide a camera accommodating an electronic flashing lamp and an auxiliary lamp which dispense with a complicated light-emission control and which have a simplified structure so as to be provided compactly in the camera without increasing the size of the camera itself and to facilitate the attachment of the lamps.

It is necessary to provide a lamp window at the case portion for the auxiliary lamp, but if a lamp window is provided separately from the diffusion window for the electronic flashing lamp, not only is the number of parts increased but also it is wasteful of manufacturing and assembling steps. The same is applied to the relationship between a finder window and a lamp window.

It is a second object of the present invention to provide a camera which has a simple case structure for providing an auxiliary lamp in a camera, thereby facilitating the manufacture and the assembly of the camera.

To achieve this end, a camera accommodating a main lamp and an auxiliary lamp according to the present invention comprises: a main lamp for electronic flashing; an auxiliary lamp for preventing a red-eye phenomenon; and a holder large enough to surround the outer periphery of the auxiliary lamp and directly hold the auxiliary lamp and composed of a material of a color having a light reflecting effect; the auxiliary lamp being directly held by the holder. Since the auxiliary lamp without any cover is directly held by the holder, the attachment of the auxiliary lamp is facilitated without the need for the adjustment of the position of the auxiliary lamp.

The holder is preferably composed of a white plastic material. The white holder serves as a reflecting plate, so that the light of the auxiliary lamp is emitted toward the front side with efficiency. The amount of light in this case increases by about 50% in comparison with the light which is emitted from the lamp without the reflecting plate. Therefore, without using a parabolic reflecting plate as in the related art, the amount of light for preventing a red-eye phenomenon is obtained with efficiency.

The auxiliary lamp is preferably provided in the area between the lens barrel at the central portion and the main lamp.

The present invention is also characterized in that at least a finder window, an electronic flash lamp window and an auxiliary lamp window are integrally provided on a transparent cover, and in that the transparent cover is attached to the camera as a part of a case.

The auxiliary lamp window is preferably a lens window having a predetermined curvature.

The above and other objects, features and advantages of the present invention will become clear from the following description of the preferred embodiment thereof, taken in conjunction with the accompanying drawings.

DESCRIPTION OF THE PREFERRED EMBODIMENT

Figure 1:
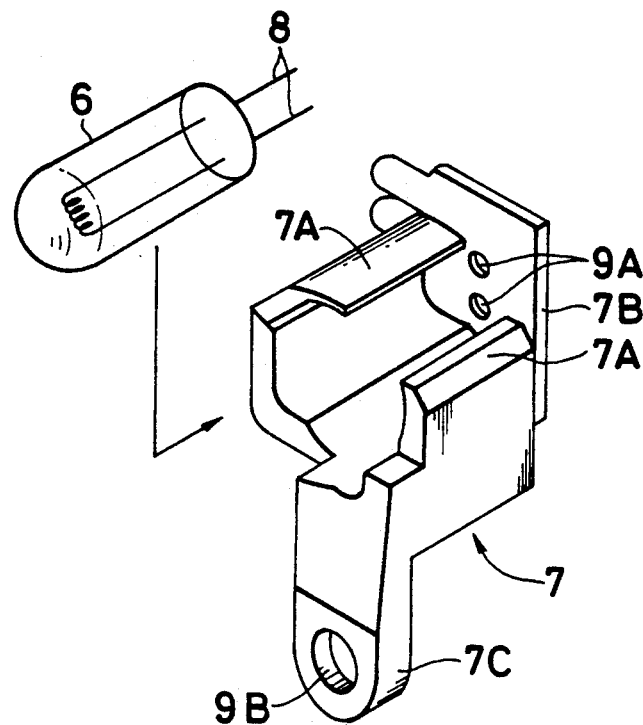
FIG. 1 is an exploded perspective view of the structure of an auxiliary lamp and a holder of an embodiment of the camera according to the present invention.

FIG. 1 shows the structure of an auxiliary lamp provided in an embodiment of a camera according to the present invention. A cylindrical lamp (tube) 6 is held by a holder 7. The holder 7 is composed of a plastic material having a white (or silver or the like) color as a whole so as to have the effect of a reflecting plate. The holder 7 is provided with an elastic grasping portion 7A having a space the inner diameter of which is equivalent to the outer diameter of the cylindrical lamp 6. The grasping portion 7A surrounds the lamp 6 and grasps the lamp 6 with elasticity. The holder 7 serves as a reflecting plate and reflects the light of the lamp 6 toward the front surface of the camera. Connection holes 9A for inserting connecting pins 8 are formed at the rear end portion 7B of the holder 7. By inserting the connecting pins 8 into the connection holes 9A, the lamp 6 is electrically connected. The lamp 6 is therefore easily attached in a firmly fixed state merely by inserting the lamp 6 into the holder 7 so as to engage them while positioning the connecting pins 8. A threaded hole 9B is provided at the lower end portion 7C of the holder 7, and the holder 7 is screwed into the camera through this threaded hole 9B.

Figure 2:
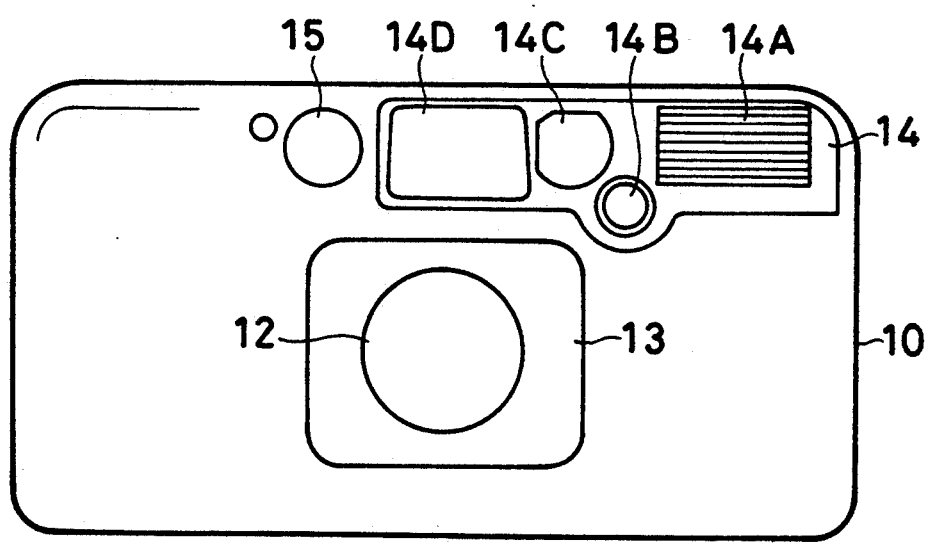
FIG. 2 is an elevational view of the case of the embodiment of a camera according to the present invention.

FIG. 2 shows the structure of the case of the embodiment of a camera according to the present invention. In FIG. 2, a lens barrel 13 having a lens 12 is disposed at the central portion of the front surface of a case 10, and a transparent cover 14 is attached to the upper portion of the front surface. The transparent cover 14 is integrally provided with an electronic flash lamp window 14A provided with diffusion bars for diffusing light, an auxiliary lamp window 14B formed as a lens window, a light receiving window 14C for autofocussing, and a finder window 14D. The auxiliary lamp window 14B is disposed on the line which connects the lens barrel 13 and the electronic flash light window 14A so as to prevent the increase in the size of the camera. That is, in the elevational view of the camera shown in FIG. 2, the line connecting the lens barrel 13 at the central portion and the electronic flash lamp window 14A at the upper portion is coincident with a diagonal of a rectangle which is the outer periphery of the camera. Therefore the distance between the lens barrel 13 and the electronic flash lamp window 14A is longer than any other distance between other parts. In this embodiment, the auxiliary lamp 6 is disposed between the lens barrel 13 and the electronic flash lamp window 14A, thereby preventing the increase in the size of the camera as a whole. A light projecting window 15 for autofocussing is disposed on the left-hand side of the finder window 14D.

Figure 3:
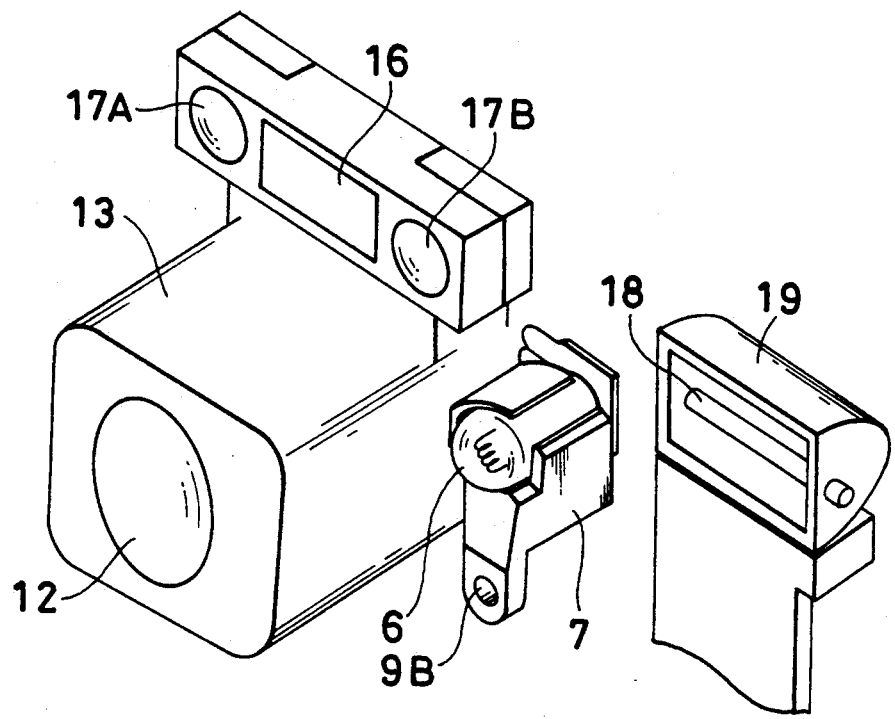
FIG. 3 is an exploded perspective view of the internal structure of the embodiment of a camera according to the present invention with the camera case removed therefrom.

FIG. 3 is an exploded perspective view of the internal structure of a camera with the case removed therefrom. As shown in FIG. 3, a finder 16, a light projecting portion 17A for autofocussing and a light receiving portion 17B for autofocussing are provided above the lens barrel 13 in correspondence with the arrangement of the windows on the transparent cover 14 and the case 10. On the upper left-hand side (right-hand side in FIG. 3) of the camera, a xenon tube 18 for electronic flashing is provided together with a semicylindrical reflecting plate 19.

The auxiliary lamp 6 is held by the holder 7 disposed in the area between the lens barrel 13 and the xenon tube 18, namely, on the line connecting the lens barrel 13 and the xenon tube 16. In this way, the auxiliary lamp 6 is disposed in the camera with efficiency.

Figure 4:
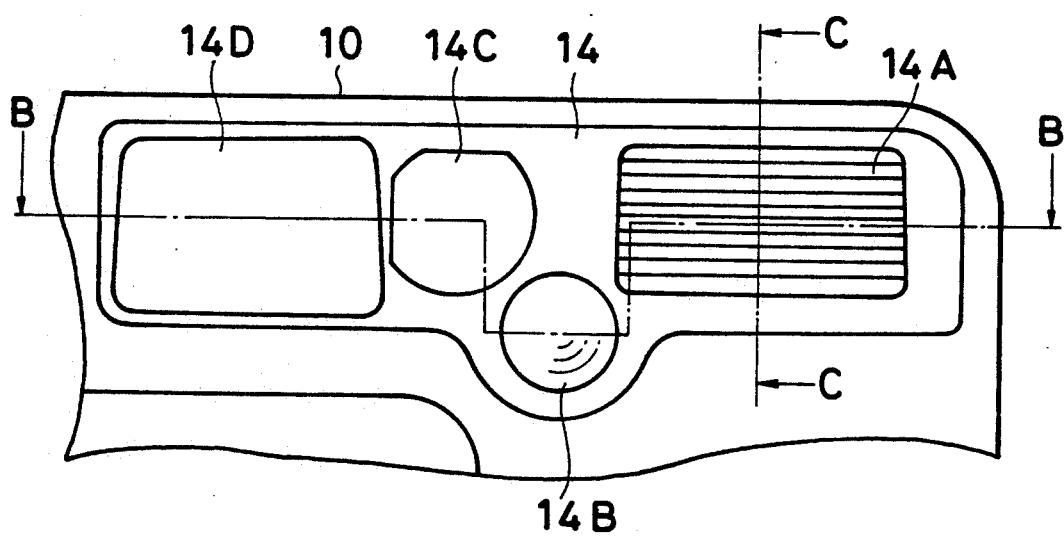
FIG. 4 is an elevational view of the detailed structure of a transparent cover portion of the embodiment.
Figure 5:
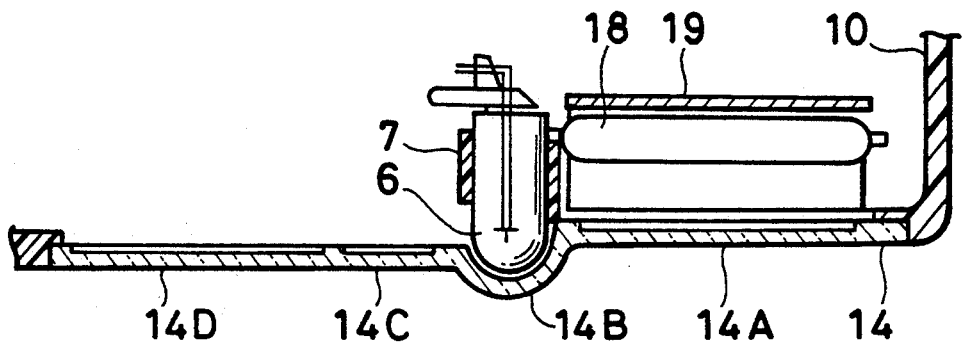
FIG. 5 is a sectional view of the structure shown in FIG. 4, taken along the line B—B.
Figure 6:
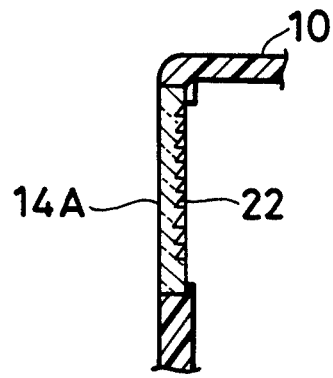
FIG. 6 is a sectional view of the structure shown in FIG. 4, taken along the line C—C.

FIG. 4 shows the detailed structure of the transparent cover 14, FIG. 5 is a sectional view of the structure shown in FIG. 4, taken along the line B—B, and FIG. 6 is a sectional view of the structure shown in FIG. 4, taken along the line C—C. The auxiliary lamp window 14B is a lens window having a predetermined curvature with due consideration of the shape of the end portion of the auxiliary lamp 6 so as to diffuse the light of the lamp 7, as shown in FIG. 5. The electronic flash lamp window 14A which is provided in correspondence with the xenon tube 18 is provided with diffusion bars 22 so as to diffuse the electronic flash, as shown in FIG. 6.

Since the electronic flash lamp window 14A, the auxiliary lamp window 14B, the light receiving window 14C and the finder window 14D are integrally provided with the transparent cover 14, and the transparent cover 14 is attached as a part of the case 10, as described above, it is possible to simplify the camera case and facilitate the manufacture and the assembly of the camera case, thereby producing a camera at a low cost.

Figure 7:
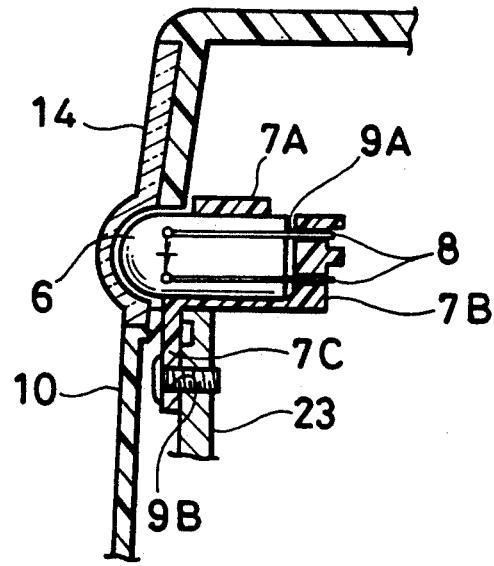
FIG. 7 is a sectional view of the side surface of the auxiliary lamp of the embodiment in the attached state.
Figure 8:
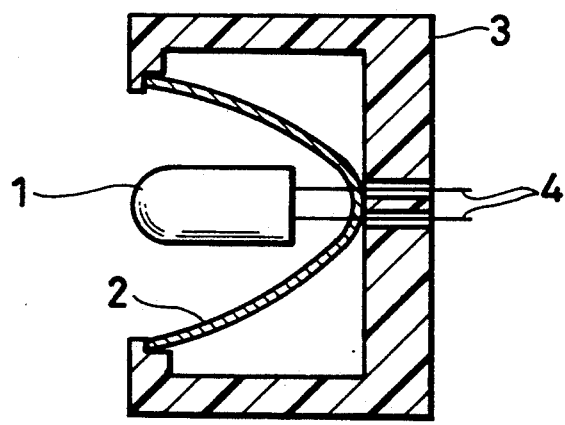
FIG. 8 is a partially sectional view of a conventional auxiliary lamp attached to a holder.

FIG. 7 shows the side surface of the auxiliary lamp 6 in the attached state. The holder 7 is screwed and fixed through the threaded hole 9B to a supporting portion 23 which is disposed in proximity to the case 10 on the front side in such a manner that the lamp 6 slightly projects from the case 10. It is therefore easy to attach or remove the auxiliary lamp 6 in the state in which the transparent cover 14 is removed.

The auxiliary lamp attached to the camera in this manner is used for preliminary flashing prior to photographing so as to prevent a red-eye phenomenon. The auxiliary lamp is also usable for other purposes. For example, it may be applied to the emission of auxiliary light when the external light is dark in passive autofocussing control. According to a light-emission experiment using the auxiliary lamp 6 of the embodiment, the amount of light was confirmed to increase about by 50% in comparison with an auxiliary lamp without the holder 7, which serves as a reflecting light. It is therefore possible to obtain a sufficient amount of light for preliminary flashing and auxiliary flashing.

As described above, according to the present invention, since the holder 7 also functions as a reflecting plate, it is possible to greatly simplify the lamp structure and to accommodate the auxiliary lamp 6 in the camera compactly while maintaining a necessary amount of light without increasing the size of the camera as a whole. In addition, since the conventional parabolic reflecting plate is obviated and the lamp 6 without any cover is directly attached to the holder 7, the attachment and the positioning of the auxiliary lamp are very easy.

In this embodiment, the light projecting window 15 for autofocussing is provided separately from the transparent cover 14, but the light projecting window 15 may also be integrally provided with the other windows on the transparent cover 14.

Although the holder 7 as a reflecting plate is composed of a white plastic material, the color is not restricted to white, and another color such as silver may be used so long as it has a light reflecting effect.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A camera accommodating a main lamp and an auxiliary lamp, said auxiliary lamp having an outer portion comprising:
   a main lamp for electronic flashing; an auxiliary lamp for preventing a red-eye phenomenon; and
   a holder surrounding and attached to the outer portion of said auxiliary lamp and directly holding said auxiliary lamp and composed of material of a color having a light reflecting effect; said auxiliary lamp being directly held by said holder, said holder extending a substantial distance along said auxiliary lamp outer portion in an axial direction.

2. A camera accommodating a main lamp and an auxiliary lamp according to claim 1, wherein said holder is composed of a white plastic material.

3. A camera accommodating a main lamp and an auxiliary lamp according to claim 1, wherein said auxiliary lamp, when viewed from the front, is disposed in the area between said lens barrel and said main lamp and on a diagonal line between said main lamp and said lens barrel.

4. A camera accommodating a main lamp and an auxiliary lamp according to claim 1, wherein said auxiliary lamp is used for auxiliary light emission to electronic flashing.

5. A camera accommodating a main lamp and an auxiliary lamp according to claim 1, further comprising: a transparent cover integrally provided with at least a finder window, an electronic flash lamp window at which said main lamp for electronic flashing is disposed, and an auxiliary lamp window at which said auxiliary lamp is disposed; said transparent cover being attached to said camera as a part of a case.

6. A camera accommodating a main lamp and an auxiliary lamp according to claim 5, wherein said auxiliary lamp window is a lens window having a predetermined curvature.

7. A camera accommodating a main lamp and an auxiliary lamp,
   said auxiliary lamp having a cylindrical outer body portion;
   an auxiliary lamp holder having at least one cylindrical surface which has a radius and an axis which are the same as said lamp cylindrical outer portion; and
   wherein said holder holds said lamp and partly surrounds said lamp cylindrical body portion along a substantial length of said auxiliary lamp holder axis.

* * * * *